(12) United States Patent
Goldstein et al.

(10) Patent No.: US 10,530,733 B2
(45) Date of Patent: Jan. 7, 2020

(54) INFERRING PREFERENCES FROM MESSAGE METADATA AND CONVERSATIONS

(71) Applicant: Hipmunk, Inc., San Francisco, CA (US)

(72) Inventors: Adam Julian Goldstein, San Francisco, CA (US); Alex Quintana, San Francisco, CA (US); Eric Palm, San Francisco, CA (US); Gregory Millam, San Francisco, CA (US); Zohaib Ahmed, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 460 days.

(21) Appl. No.: 15/348,877

(22) Filed: Nov. 10, 2016

(65) Prior Publication Data

US 2017/0134335 A1    May 11, 2017

Related U.S. Application Data

(60) Provisional application No. 62/253,659, filed on Nov. 10, 2015.

(51) Int. Cl.
*H04L 12/58* (2006.01)
*H04L 29/08* (2006.01)

(52) U.S. Cl.
CPC .............. *H04L 51/36* (2013.01); *H04L 51/02* (2013.01); *H04L 51/046* (2013.01); *H04L 51/38* (2013.01); *H04L 67/20* (2013.01); *H04L 51/34* (2013.01)

(58) Field of Classification Search
CPC ......... H04L 51/36; H04L 51/02; H04L 67/20; H04L 51/38; H04L 51/046; H04L 51/34
USPC ......................................................... 709/206
See application file for complete search history.

(56) References Cited

U.S. PATENT DOCUMENTS

| | | | | |
|---|---|---|---|---|
| 2008/0172362 | A1* | 7/2008 | Shacham | G06F 16/951 |
| 2009/0303942 | A1* | 12/2009 | Camilleri | H04L 29/06027 370/329 |
| 2010/0260327 | A1* | 10/2010 | Ray | H04M 1/247 379/93.23 |
| 2012/0110052 | A1* | 5/2012 | Smarr | H04W 4/21 709/201 |
| 2013/0185806 | A1* | 7/2013 | Hatakeyama | H04L 63/20 726/27 |
| 2013/0218923 | A1* | 8/2013 | Kaul | H04M 1/72522 707/769 |

(Continued)

*Primary Examiner* — Chris Parry
*Assistant Examiner* — Weiwei Y Stiltner
(74) *Attorney, Agent, or Firm* — Schwegman Lundberg & Woessner, P.A.

(57) ABSTRACT

Example embodiments provide a system and method for inferring preferences from message metadata and conversations. A networked system receives, over a network, a communication that is a part of a conversation involving one or more users, whereby the networked system is a participant in the conversation. The networked system analyzes the communication including inferring a preference of a user among the one or more users based on metadata in the communication. The networked system triggers a search process based in part on the inferred preference. The networked system then generates and transmits to the user a customized response comprising results of the search process.

18 Claims, 7 Drawing Sheets

(56) References Cited

U.S. PATENT DOCUMENTS

| | | | |
|---|---|---|---|
| 2014/0279722 A1* | 9/2014 | Singh | G06N 5/022 |
| | | | 706/11 |
| 2014/0280553 A1* | 9/2014 | Hernandez | H04L 67/22 |
| | | | 709/204 |
| 2015/0100437 A1* | 4/2015 | Guo | G06Q 10/107 |
| | | | 705/14.73 |
| 2015/0371155 A1* | 12/2015 | Saint-Just | G06Q 10/02 |
| | | | 705/5 |
| 2016/0019527 A1* | 1/2016 | Miqueo | G06Q 20/3255 |
| | | | 705/44 |
| 2016/0147847 A1* | 5/2016 | Lakshmanan | G06N 20/00 |
| | | | 706/12 |
| 2016/0358242 A1* | 12/2016 | Lagos | G06F 16/243 |
| 2016/0366370 A1* | 12/2016 | Hamling | H04N 7/147 |
| 2017/0052949 A1* | 2/2017 | Baldwin | G06F 17/2785 |
| 2017/0219367 A1* | 8/2017 | Liu | G06Q 50/10 |

* cited by examiner

INFERRING PREFERENCES FROM MESSAGE METADATA AND CONVERSATIONS

CROSS REFERENCE TO RELATED APPLICATION

The present application claims the priority benefit of U.S. Provisional Patent Application Ser. No. 62/253,659, filed on Nov. 10, 2015 and entitled "Inferring Preferences from Message Metadata and Conversations" which is incorporated herein by reference in its entirety.

FIELD

The subject matter disclosed herein generally relates to the technical field of special-purpose machines that facilitate inferring preferences, including computerized variants of such special-purpose machines and improvements to such variants, and to the technologies by which such special-purpose machines become improved compared to other special-purpose machines that facilitate inferring preferences. Specifically, the present disclosure addresses machines and methods to facilitate inferring preferences from message metadata and conversations.

BACKGROUND

Websites enable users to search for a variety of information including products and services. Additionally, some websites allow a user to reserve a selected product or service. In many instances, the user must be proactive in visiting different websites and entering search criteria in order to find relevant information and to compare and select different types of options. More specifically, in the travel industry, a number of websites enable a user to search for and make reservations. Concurrently, metasearch sites exist which combine travel options from several online travel agents, airlines, hotels, and other travel suppliers, giving the user a greater selection than may be obtained from a single airline. However, websites do not automatically detect preferences of the user or incorporate those preferences into a search for relevant information (e.g., travel components of a travel itinerary).

BRIEF DESCRIPTION OF DRAWINGS

Various ones of the appended drawings merely illustrate example embodiments of the present subject matter and cannot be considered as limiting its scope.

DETAILED DESCRIPTION

Figure 1:
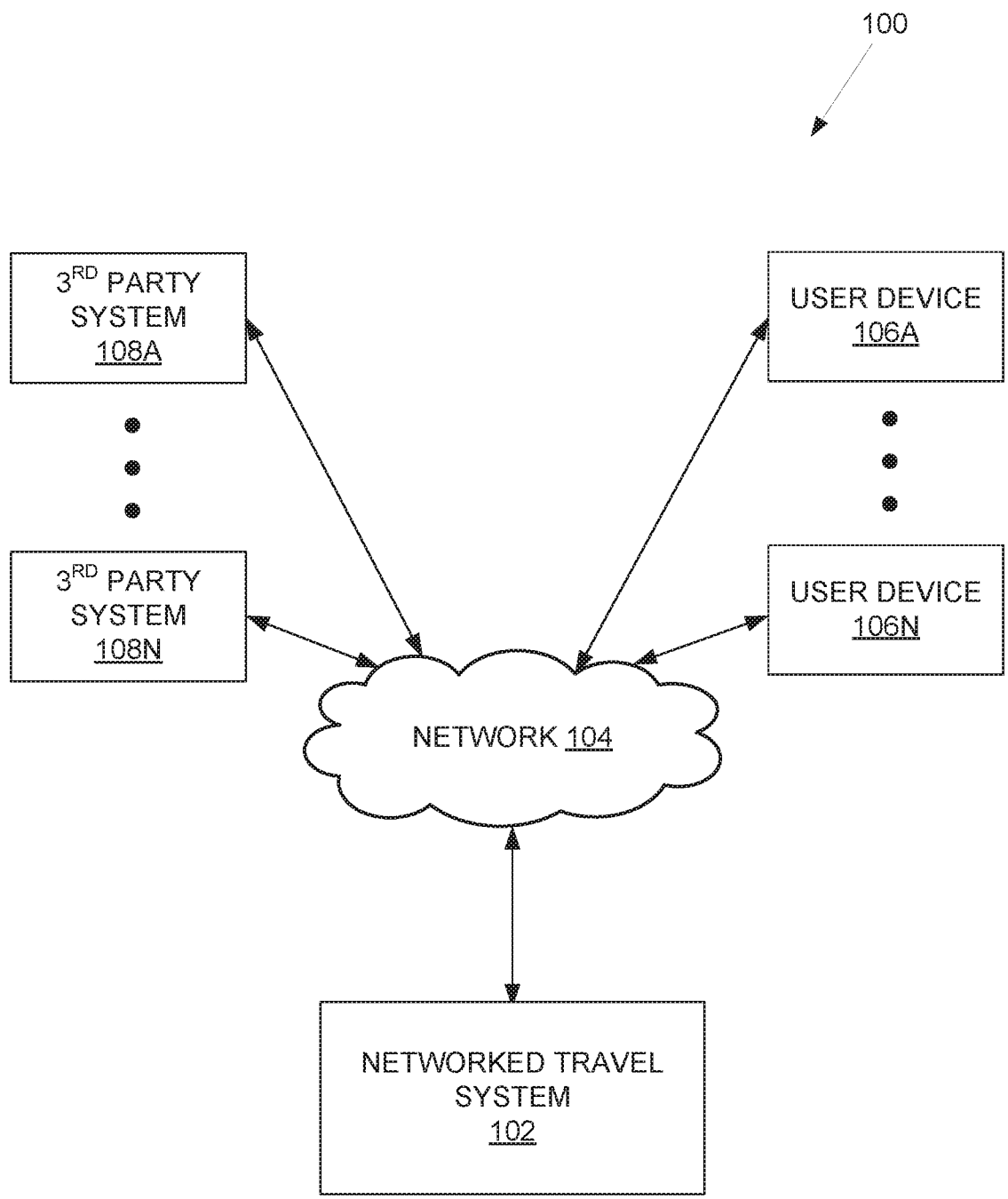
FIG. 1 is a network diagram illustrating a network environment suitable for performing automatic conversation analysis and participation, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) facilitate inferring preferences from message metadata and conversations, and example systems (e.g., special-purpose machines) are configured to infer preferences from message metadata and conversations. In particular, example embodiments provide mechanisms and logic that automatically analyze conversations (e.g., text in a communication involved in the conversation) in which a networked system is a participant (e.g., cc'd or otherwise indicated as a recipient of the communication in the conversation), and infer one or more preferences of a user based on metadata in the communication. In some example embodiments, the mechanisms and logic triggers a search process based in part on the inferred preference. Subsequently, the mechanisms and logic generates a customized responses comprising results of the search process, and transmits the customized response to a device of the user.

As a result, one or more of the methodologies described herein facilitate solving the technical problem of providing customized responses based on automatically analyzed and processed text in communications exchanged involving the networked system and based on inferred preferences of the user. The methodologies include receiving, over a network, a communication that is a part of a conversation involving one or more users, whereby the networked system is a participant in the conversation (e.g., explicitly indicated as a recipient of the communication). The networked system analyzes the communication including inferring a preference based on metadata in the communication. Using the inferred preference, the networked system triggers a search process. The results of the search process are used by the networked system to generate a customized response, which is transmitted to a device of the user. As such, one or more of the methodologies described herein may obviate a need for certain efforts or resources that otherwise would be involved in a user having to navigate to a plurality of service providers and performing numerous searches at each service provider in order to obtain customized search results based on preferences of the user. Instead, example embodiments analyzes communications of the user, infers preferences, and, in some embodiments, proactively (e.g., without user intervention) performs a search process using the inferred preference for information relevant to the user. That is, the user does not need to perform countless searches or navigate to a plurality of websites, but may be retained by a website of the networked system. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a network diagram illustrating a network environment 100 suitable for operating a networked system 102 that is configured to analyze conversations and infer preferences from message metadata and the conversations, according to some example embodiments. The network environment 100 includes the networked system 102 communicatively coupled via a network 104 to a plurality of user devices 106A-106N. The networked system 102 comprises one or more server machines configured to automatically receive and analyze conversations (e.g., communications exchanged) with users (at their respective user device 106), and to selectively participate in the conversations by providing, when applicable, tailored responses. In one example embodiment, the networked system 102 is a networked travel system that analyzes the conversations and presents the user with options (e.g., travel options) that assists the user in planning a travel itinerary. In example embodiments, the tailored responses are based on preferences inferred from one or more messages (also referred to herein as "communications") that are a part of a conversation in which the networked system is a participant (e.g., a designated recipient of the communication). In some embodiments, the tailored response comprises user interfaces indicating one or more selectable options or a reply communication that includes or provides links to the selectable options. These preferences may be retained (e.g., stored to a user profile by updating a data structure or storage associated with the networked system 102) and used for future search processes.

The networked system 102 is also coupled, via the network 104, to a plurality of third-party systems 108A-108N. Each of the third-party systems 108 may be, or include a database (or data storage) that comprises corresponding information or are associated with selectable options. For example, a third-party system 108 may be a hotel system that includes a database of hotel room inventory. In another example, the third-party system 108 comprises a weather information system that includes a database of weather data (e.g., current temperature, forecasts, and historical climate for various locations). In some example embodiments, the third-party system 108 comprises a web server machine operated by a third-party (e.g., an entity distinct from an entity that operates the networked system 102). The networked system 102, the user devices 106A-106N, and the third-party systems 108A-108N may each be implemented in a computer system, in whole or in part, as described below with respect to FIG. 8.

Any of the systems, databases, or devices (each also referred to as a "machine") shown or discussed in FIG. 1 may be implemented in a special-purpose computer that has been modified (e.g., configured or programmed) by software (e.g., one or more software modules) to perform one or more of the functions described herein for that machine. For example, a computer system able to implement any one or more of the methodologies described herein is discussed below with respect to FIG. 8. As used herein, a "database" is a data storage resource and may store data structured as a text file, a table, a spreadsheet, a relational database, a triple store, a key-value store, or any suitable combination thereof. Moreover, any two or more of the machines illustrated in FIG. 1 may be combined into a single machine, and the functions described herein for any single machine may be subdivided among multiple machines.

The network 104 may be any network that enables communication between or among the systems and devices (e.g., the networked system 102 and the user device 106A). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof. Accordingly, the network 104 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 104 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
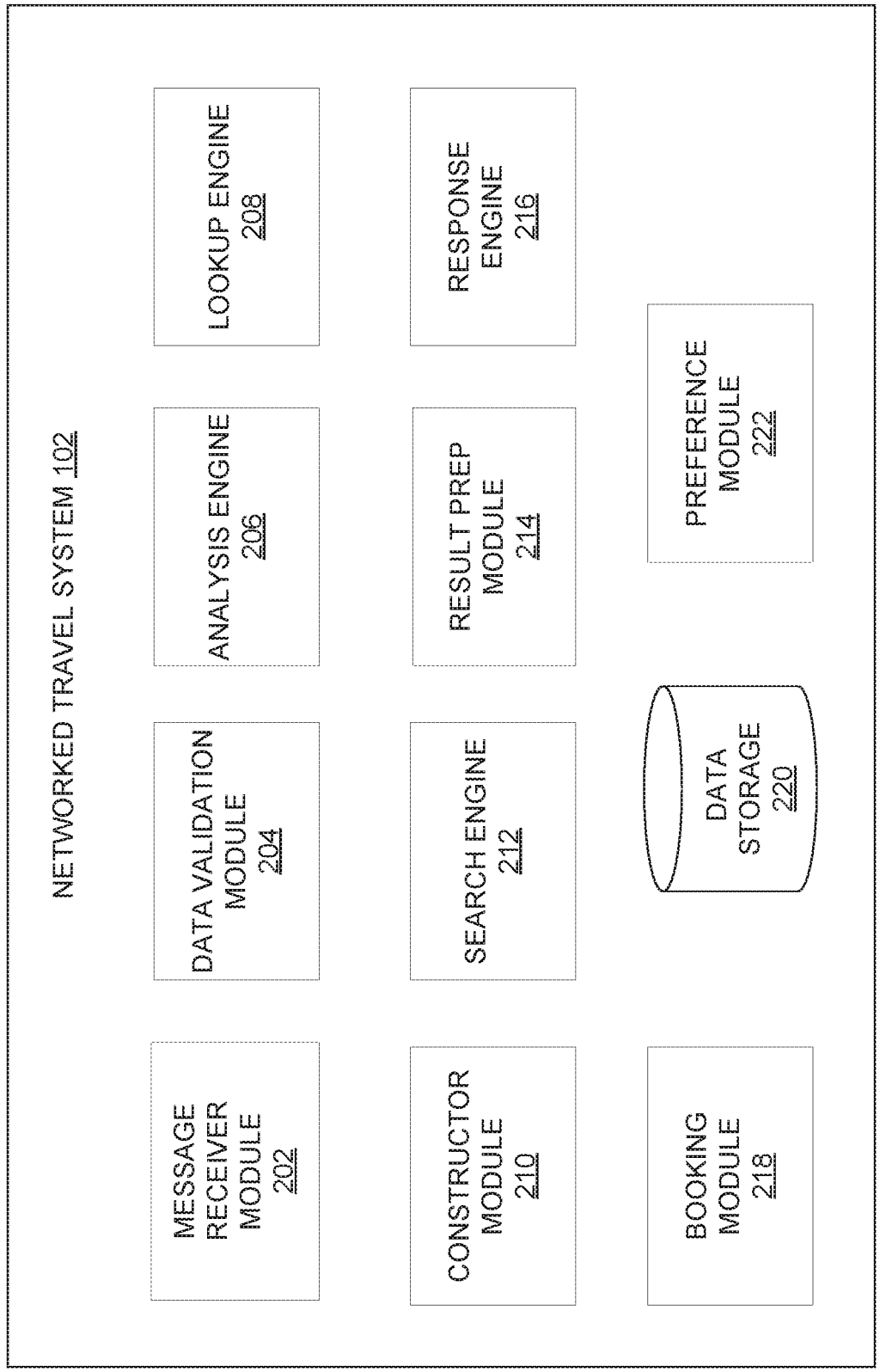
FIG. 2 is a block diagram illustrating components of a networked system, according to some example embodiments.

FIG. 2 is a block diagram illustrating components of the networked system 102, according to some example embodiments. The networked system 102 is configured to work with a user (e.g., customer) through a lifecycle (e.g., a travel lifecycle) and to understand individual and group needs by recognizing unique scenarios within conversations in which the networked system 102 is also a participant (e.g., designated as a recipient of communications in the conversation). The networked system 102 is further configured to understand tone, keywords, conversation styles, or any suitable combination thereof, and to infer preferences from the conversations. Some or all of the preferences are stored to a user profile for future use (e.g., future search process).

Accordingly, the networked system 102 receives communications included in conversations in which the networked system 102 is a participant (e.g., the user includes the networked system 102 as recipient of the communication). The communication may comprise an e-mail, an SMS or MMS (or other form of a text messaging), chat message, or any other form of communication that is exchangeable between participants. The networked system 102 automatically analyzes the communication to determine whether and how to respond in the conversation (e.g., whether to ask a question or provide options, and the specificity of the questions or options to provide), and to determine preferences based (e.g., entirely or in part) on message metadata in the communication. To enable these operations, the networked system 102 comprises a message receiver module 202, a data validation module 204, an analysis engine 206, a lookup engine 208, a constructor module 210, a search engine 212, a result preparation module 214, a response engine 216, a booking module 218, at least one data storage 220, and a preference module 222.

The message receiver module 202 is configured to receive communications (or messages) and queries from the user device 106. For example, a first user at the user device 106A sends an e-mail communication to a second user at the user device 106N. The communication includes the networked system 102 as a designated recipient of the communication (e.g., as a primary recipient, as a carbon copy recipient, or as a blind carbon copy recipient). As such, the networked system 102 becomes a participant in a conversation between the first and second users. It is noted that any number of users may be involved in a conversation. For example, the conversation can include simply the first user and the networked system 102. The communication received by the message receiver module 202 can comprise an e-mail message, a chat message, a text conversation, or any other form of communication between one or more users involving the networked system 102.

In one embodiment, the message receiver module 202 identifies the individual users within the conversation and recognizes which communications have come from which users in the conversation. As a result, the response engine 216 is able to address users individually and provide customized responses (e.g., a different set of options) to each of the users in a group of user that may be, for example, traveling or performing some action together. By identifying which user is providing each communication in the conversation, the networked system 102 is able to track different needs of individuals (e.g., users may be flying from different airports or traveling on different dates).

The data validation module 204 is configured to validate the communication received by the message receiver module 202. In some example embodiments, the data validation module 204 checks for spelling errors (e.g., in a name of a location indicated in the communication). The data validation module 204 further determines a date formatting used in the communication (e.g., a month-date-year format versus a date-month-year format).

Once the data is validated, the communication is passed to the analysis engine 206, which processes the communication and analyzes data in the communication to identify (e.g., parse, extract, or infer) one or more preferences, one or more key terms, and a sentiment of each user for use in determining whether to respond and how to respond (e.g., with a question or with options, such as travel options for a travel itinerary) for the one or more users involved in the conversation. In some example embodiments, the analysis engine 206 looks at metadata associated with the communication (e.g., such as area code, country code, e-mail domain, number of recipients, last names of recipients, frequency of communications in the conversation) to infer preferences. These preference are then stored in (e.g., saved to a corresponding profile of the corresponding user by the preference module 222.

In some example embodiments, the analysis engine 206 also parses the communication to identify (or extract) the key terms. The key terms may then be associated with the user(s) involved in the conversation and stored to a profile, account, or data structure linked to the user(s) in the data storage 220. The analysis engine 206 also determines the sentiment of the user(s) which indicates whether the networked system 102 should respond in the conversation, when to respond in the conversation, and what information to present in the response (e.g., level of detail to respond with). The analysis engine 206 will be discussed in more detail in connection with FIG. 3 below.

The lookup engine 208 is configured to access various data sources to retrieve information that is usable in performing a search for information or options (e.g., travel options/components that make up a travel itinerary). The data sources may include a user profile for each user in the conversation. The user profile may comprise preferences (e.g., airline, car, or hotel preferences), home or origin information (e.g., home airport), past itineraries, and other information that is retrievable by the lookup engine 208 and that may affect the search (e.g., as parameters). The data sources may also include calendar data for the user. In some embodiments, the data sources comprise external (to the networked system 102) data sources such as a historical weather source or traffic source. Besides being used in the search process, the retrieved information may also be used to filter, sort, and weigh the search results to generate a customized response tailored to each user. The lookup engine 208 will be discussed in more detail in connection with FIG. 4 below.

The constructor module 210 is configured to construct a search query based in part on data obtained (e.g., extracted, parsed) or inferred from the communications in the conversation. As such, the constructor module 210 creates a search query based on user's unstructured text from the conversation and preferences (e.g., inferred from the communication, retrieved from the profile of the user). In some example embodiments, the constructor module 210 merges data retrieved by the lookup engine 208 along with key terms parsed/extracted by the analysis engine 206 with preferences detected or inferred by the analysis engine 206 and any preferences from the profile of the user retrieved by the lookup engine 208 in generating the search query. In some example embodiments, the constructor module 210 also sorts, filters, and weighs one or more of the data retrieved by the lookup engine 208 or the key terms detected by the analysis engine 206 in generating the search query.

The search engine 212 receives the search query and triggers performance of one or more searches to identify information or options (e.g., matching travel options or components) In some example embodiments, the search engine 212 accesses partner databases located at the third-party systems 108 to identify the options. In these embodiments, the search engine 212 may construct an API request (or the search query generated by the constructor module 210 is the API request) and makes API calls to the third-party systems 108 requesting information or the options. For example, the API call triggers a hotel system to identify available hotel rooms in a particular location over a particular time period and determine corresponding room rates. Other third-party systems 108 to which API calls are made to may include airline systems (e.g., to search for available flights and fares), car rental systems (e.g., to find rental car availability and rates), and events systems (e.g., find tickets to an event), as well as other systems that search for bundled options available only by reserving multiple types of inventory at the same time (e.g. flights, hotels, and cars) and other systems that provide travel relevant information (e.g., weather conditions, traffic conditions, maps and navigation, flight status). It is noted that while example discuss searches being conducted to obtain travel related information and options, example embodiments are not so limited and any type of information or option may be searched.

The search results obtained by the search engine 212 are provided to the result preparation module 214, which prepares the search results for presentation to the user(s). In example embodiments, the result preparation module 214 tailors the search results based on one or more of preferences of the user, preferences of similar users, and external data (e.g., weather, traffic) to derive a set of results or options customized to the user(s). For example, if weather for a particular connecting airport is historically bad over a particular time period (e.g., normally expect snow storms) and thus can cause a flight delay, the result preparation module 214 selects an alternative flight route through a connecting airport that historically has better weather. This may be the case even though the flight route through the connecting airport having the historically bad weather is cheaper or has a shorter layover. In further embodiments, the result preparation module 214 uses historical travel information to weigh the results (e.g., based on customer reviews "other families loved this hotel because it had free breakfast."). As such, the result preparation module 214 weighs various factors (e.g., based on preferences and external data obtained by the lookup engine 208) to rank the search results and to generate the customized set of results or options for each user. It is noted that each user in the conversation may have a different set of results based in part on their preferences and associated key terms (e.g., origin of departure).

Further still, the result preparation module 214 considers inferred goals of the trip by using key terms parsed or identified, or preferences inferred, from the communication to modify information in the set of results to best meet those goals. For example, if the user refers to a sport game or concert in the communication, the result preparation module 214 may recommend hotels close to the arena where the sports game or concert is occurring. In this example, the result preparation module 214 can also match a user's goal to specific hotels based on prior customer reviews. The result preparation module 214 also filters for both positive matches and opposite matches. For example, if the user indicates that they are "looking for a quiet place," the result preparation module 214 filters out any hotels with keywords of "party," "night club," or "loud neighborhood." These filter terms may be accessed from a library of filter terms that are "learned" by a component (e.g., machine, device) of the networked system 102 through training (which will be discussed further below).

The response engine 216 is configured to determine whether to respond during a conversation with a user or between a plurality of users and what type of response to provide (e.g., based on stage of conversation). Additionally, the response engine 216 generates the response, which in some embodiments, comprises customized set of results or options (generated by the result preparation module 214) and transmits, via the network 104, the response to the user(s) involved in the conversation.

In some example embodiments, the networked system 102 contributes to the conversation as appropriate. Accordingly, the response engine 216 works with the analysis engine 206 to determine which phase in a lifecycle the user(s) in the conversation are currently at and a sentiment of the user(s) (as will be discussed further below). Examples of times when the networked system 102 proactively enters the conversation include when the user specifically asks the networked system 102 a question (e.g., "Can you help us plan a bachelor party?"). In response, the response engine 216 provides a response (e.g., "Yes, I'm happy to help—sounds like fun!"). The response may be obtained from a library of responses maintained in the data storage 220.

Further still, the response engine 216 takes into account actions that indicate that the user wants the networked system 102 to pay attention when the networked system 102 otherwise may not. For example, after forwarding an e-mail to a friend, the user may keep the networked system 102 copied (e.g., cc'd) on the email. In this situation, the networked system 102 normally will not chime in. However, if the user specifically includes language requesting the networked system 102 for help (e.g., "@Hipmunk, help me . . . " or a similar phrase at the beginning of the e-mail), the networked system 102 will interpret this as an indicator that the networked system 102 should definitely reply. Thus, if the networked system 102 (e.g., the response engine 216) recognizes a question addressed to the networked system 102, the response engine 216 replies.

In one embodiment, the response engine 216 determines whether the communication included a question to the networked system 102 by looking for certain cues that are previously trained to a machine associated with the networked system 102 (e.g., a server of the networked system 102). For example, the machine is given 800 samples that the networked system 102 knows are questions or inquiries, and "taught" by tagging parts of communication that identify the parts as, for instance, travel-specific questions. As examples:

"Flight . . . [location 1] . . . [location 2]"
"Place to stay . . . [location]"
"from [location 1] . . . to [location 2]".

Part of the logic in establishing that something meets the above patterns by the networked system 102 is "knowing" that something is a "location." There are rules such as, if it comes directly after the word "from," then it must be a location—even if the networked system 102 has never seen that particular location before. Another example rule is a dash (e.g., "Toronto-Kansas City"). In this example rule, the dash is recognized as dividing an origin and destination. These rules may be stored in the data storage 220 and accessed by various components of the networked system 102 during the analysis and search process.

As a general note, there will be instances in which the networked system 102 is not "sure enough" it will be able to confidently reply. In these cases, the networked system 102 may either give a "best guess" reply (e.g., with a "sorry if this is totally off"-type comment) to the user or forward the question to a human agent (e.g., with an e-mail, text message to an agent's phone), so that a known-sensible reply can be provided. The networked system 102 will then learn from this to form future replies in line with previously described learning techniques.

There are other situations when the response engine 216 will provide a reply. For example, if the user gives the networked system 102 a command (e.g., "Hipmunk, find me hotels in Las Vegas."), the response engine 216 will reply (e.g., with hotel options). In another example, the user references the networked system 102 (e.g., "Guys, I've cc'd Hipmunk to help us plan our trip to Vegas."). The response engine 216 then provides an appropriate reply (e.g., "Great! Can you let me know when you'd like to go to Vegas?"). Further still if the user provides information needed to do a travel search (e. "Fly from SFO to Vegas October 17-19."), the response engine 216 provides a reply.

Alternatively, the response engine 216 determines, in some situations, that a reply is not appropriate. These situations may include if the user does not address the networked system 102 in their communication, but is only asking questions of friends/other users in the conversation; the conversation is not about a particular topic associated with the networked system 102 (e.g., travel topic for a networked travel system); it is unclear why the user has added the networked system 102 to the conversation; or when the networked system 102 determines it should listen to the conversation for an appropriate time to contribute.

The booking module 218 is configured to process booking of travel options or components identified in the customized set of results in embodiments where the networked system 102 comprises a networked travel system. In some example embodiments, the user(s) selects a proposed itinerary or various travel options from the customized set of options provided in, or associated with, the response generated and transmitted by the networked system 102, and provides an indication to reserve or pay for those travel options. In response, the booking module 218 processes the reservations or payments (e.g., notifies a travel partner at the corresponding third-party system 108 to reserve the travel component and transmits payment if needed). In one embodiment, a level of assistance by the booking module 218 with the booking is dependent on availability of customer saved payment options. Data associated with the booking (e.g., confirmation number, receipt, booked travel itinerary) are stored to an account or data structure linked to the user(s) in the data storage 220.

The data storage 220 maintains one or more accounts (also referred to as "profile" or "user profile") or data structures linked to each user of the networked system 102. The data structures include past search history, past travel purchase history, current travel planning information (e.g., key terms identified by the analysis engine 206), preferences (both explicit and inferred), booked itineraries, and any other user specific information that can be used by the networked system 102 to customize searches, search results, and responses to each user. The preferences include one or more preferences identified by the analysis engine 206 from previous communications or conversations and stored by the preference module 222 to a profile of the corresponding user. Examples of such preference include, but are not limited to, time of day preferred for flight departure, preferred airport, preferred rental car type, preferred rental car brand, preferred airline, preferred airline seat or class, brand loyalty memberships (e.g., Star Alliance, Hilton HHonors), airline or hotel membership level (e.g., Star Alliance Gold), preferred hotel brand, preferred hotel type (boutique, business), preferred hotel amenities (e.g., near elevator, high floor), frequent itineraries (which may be continually monitored for sales), and frequent travel locations (e.g., indication that the user is visiting family). One or more of these preferences may be used to tailor the search query and the search results to derive the customized set of results and a tailored response for the user.

The data storage 202 may comprise one or more databases. As used herein, a "database" is a data storage resource and may store data structured as a text file, a table, a spreadsheet, a relational database (e.g., an object-relational database), a triple store, a hierarchical data store, or any suitable combination thereof.

Figure 3:
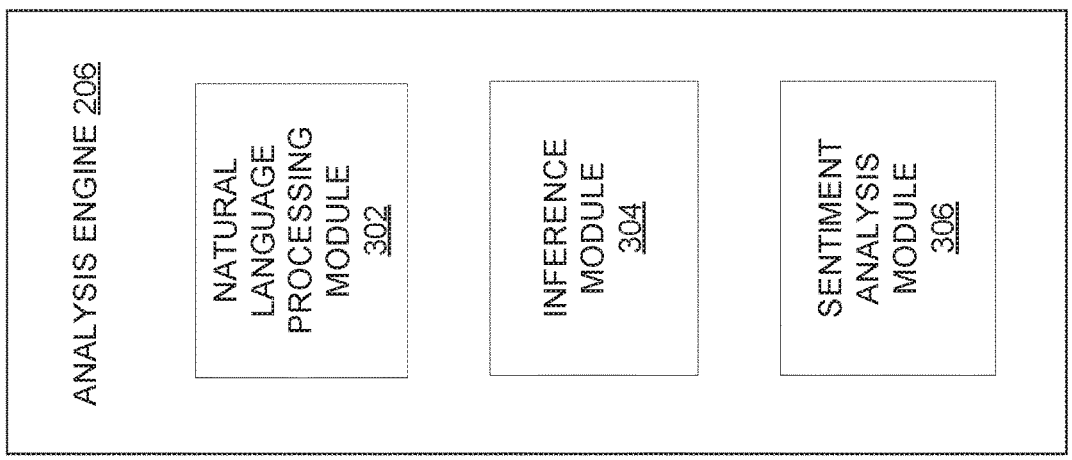
FIG. 3 is a block diagram illustrating components of an analysis engine, according to some example embodiments.

FIG. 3 is a block diagram illustrating components of the analysis engine 206, according to some example embodiments. The analysis engine 206 is configured to parse the communication, analyze communication data to determine key terms and a lifecycle phase (e.g., travel lifecycle phase) of the user(s), and infer preferences from the communication. In order to perform these operations, the analysis engine 208 comprises a natural language processing module 302, an inference module 304, and a sentiment analysis module 306.

The natural language processing module 302 is configured to use natural language processing algorithms to understand what the user has asked or communicated in a communication. For example, if the user uses an abbreviation for a particular location, the natural language processing module 302 understands the abbreviation represents the particular location. Similarly, if the user misspells a word, the natural language processing module 302 attempts to determine the correct spelling and to interpret the user's request as if the spelling had been correct to begin with. In some example embodiments, the natural language processing module 302 parses the communication in order to identify key terms that are provided to the constructor module 210 to generate the search query.

In situations where the user is not explicit in their communication regarding travel plans, for example, the inference module 304 attempts to identify the key terms. For example, the user may either use indirect destination or event definitions (e.g. "my house," "my birthday") or not specify the origin at all (e.g. "find me flights to New York"). In these instances, the inference module 304 taps into an existing database of customer knowledge (e.g., profile of the user, data in the data storage 220) to establish what the user likely means. For example, if the user gives a location as "home," the inference module 304 accesses a user profile of the user to determine where "home" is. In one instance, an IP address of the user can be used to determine a "home" location (e.g., city) of the user. In another example, if the user references an event (e.g., SXSW), the inference module 304 infers (e.g., from stored or accessed data) that SXSW is in Austin. If the user indicates in a subsequent reply that the networked system 102 is wrong, then the networked system 102 learns for next time. Alternatively, if the networked system 102 does not have confidence in an interpretation of what the user means as their destination (or dates, event, etc.), the response engine 216 sends the user a clarifying e-mail, SMS (or other form of text messaging), chat message, or other form of communication, and subsequently interprets the user's reply as canonical.

For dates, the inference module 304 can use knowledge of common travel behaviors to infer dates even if the dates are not explicitly stated. For example, the inference module 304 knows (e.g., from data in the data storage 220) that most people traveling for Thanksgiving want to travel Wednesday through Sunday from historical booking data. Therefore, if a user asks to travel to "Boston for Thanksgiving," the inference module 304 infers that the user likely means to travel from Wednesday through Sunday rather than travel on the date of Thanksgiving.

In some instances, it is initially ambiguous which dates and destinations go together. For example, the communication may recite: "I'm trying to book a trip to Pittsburgh for my cousin's wedding on October 3, and then we're going to tour the Carnegie museum, and stay in a hotel on October 4 to October 7, and then return on October 30." In these instances, the inference module 304 understands that there are multiple dates spread out across the communication that chronology determines the ordering of trips. A first chronological date in the communication is inferred to be an initial departure date, while a last chronological date is inferred to be a final return date. In this example, the inference module 304 also recognizes existence of a "nested" trip, because the middle two dates fall entirely within the initial departure date and the final return date. As a result, the search engine 212 is triggered (e.g., by the inference module 304) to perform multiple searches and combine the results in the reply. The inference module 304 knows that the middle dates correspond to a hotel search because the middle dates are physically proximate (e.g., within the sentence, itself) closer to the word "hotel" than the word "flight" (or, in this case, something that implies a flight). In cases where the user provides a budget, the networked system 102 provides dates or options that match the budget.

Other information may be inferred by the inference module 304. As examples:
- "My last trip" references back to a user's prior search or booking history.
- "My meeting in Chicago" is meaningful if the user had given access to his calendar.
- "Someplace warm" taps into a database of seasonal weather patterns in cities around the world.

Past search histories are also taken into account by the inference module 304 to understand what an ambiguous location means. For example, if a user says "Flights to Springfield," the inference module 304 references against a database of what the most-searched-for "Springfield" is, and return those results, unless the user indicates otherwise.

The inference module 304 also infers preferences based on message metadata to deliver a tailored experience to the user. In some example embodiments, the inference module 304 detects an area code from a message (e.g., SMS message). Based on the area code, the inference module 304 identifies a preferred (e.g., origin) airport or home city (e.g., based on a closest or largest airport to a population area in a certain area code). If the communication involves a group of users, the inference module 304 uses the area code to infer whether the group is coming from one location or many points of origin. If multiple area codes are detected, the networked system 102, in one example embodiment, asks individual users to confirm if they are coming from the cities associated with their respective area coded. Alternatively if the same area code is detected for the group of users, the networked system 102 asks the users whether they are coming from the same city.

As a result of the networked system 102 knowing the user's home city (e.g., and further based on past stored itineraries in the user profile), the networked system 102 identifies when the user is traveling to a new location. Based on this knowledge, the inference module 304 can determine a distance from the new location to the user's home city, and the result preparation module 214 tailors hotel or flight recommendations. Further still, the response engine 216 can provide city guides and tour information (e.g., obtained from the data storage 220 or the third-party system 108) for the new location.

In some example embodiments, the inference module 304 also detects a country code from a message (e.g., SMS message). Based on the country code, the inference module 304 knows the home country of the user. Knowing the home country, the networked system 102 tailors actions or options for the user. For example, the response engine 216 can provide a response in a language associated with the home country, provide costs in a local currency, or use a local point of sale mechanism (e.g., local payment service). Additionally, by knowing the user's home country, the inference module 304 recognizes when a user is planning travel to a foreign country. Based on this knowledge, the inference module 304 can determine a distance that foreign destination is from the user's home country, and the result preparation module 214 proactively tailors hotel and flight recommendations (e.g., and also based on other traveler's recommendations and feedback). For example the result preparation module 214 can use prior travel booking knowledge (e.g., reviews, feedback) that indicate that other people traveling from the same home country as the user enjoyed staying in a particular hotel. Further still, the response engine 216 can provide travel information (e.g., country guides, currency conversions) for the foreign destination.

The inference module 304 also infers preferences based on an email domain of the communication or message. For example, an ".edu" domain may indicate that the user is eligible for a student or faculty discount (e.g., discount preference), while a business or corporate domain may indicate different hotel or flight preferences (e.g., business oriented, near city business center, has full business center, business class seat). In cases where the networked system 102 infers that the user is a business customer, the networked system 102 can ask the user whether they have a hotel or airline loyalty membership or preferred airline or hotel chain. These preferences are stored by the preference module 222 to the user profile of the user and can be used as reference to tailor future experiences (e.g., future searches, recommendations, or set of options to present in response to a search query) for the user.

The inference module 304 also looks at a number of recipients on an e-mail or a group text or chat to infer information for use by the networked system 102. For example, based on the number of recipients, the inference module 304 can identify whether there is a single traveler or a group of travelers. The number of travelers may further indicate a preference towards, for example, renting a house instead of staying a hotel. The number of travelers also indicates a number of seats to search for or to hold on a flight, number of hotel rooms to search for or hold at a hotel, a type of lodging (e.g., hotel, rental house) to recommend, or a size of a house rental to recommend. Further still, the search engine 212 can identify (or send instructions to third-party systems 102 to identify) any travel discounts given for a group of travelers.

As additional individuals are added or removed from a conversation, the inference module 304 infers further information and causes the search engine 212 and the result preparation module 214 to tailor the search and the search results. For example, an addition of a new person to the conversation may indicate a new decision maker or traveler. In another example, a person (or an addition of a new person) with a same last name as a user already a party to the conversation may indicate a family member of the user (e.g., spouse) that would want to travel together with the user.

The inference module 304 also looks at a frequency of e-mails, chats, and messaging to determine a level of engagement of the user with previously presented search results. This provides the networked system 102 with an indication of how to pace replies/responses to match the level of engagement. For example, the networked system 102 does not want to overwhelm the user with many replies if the user is not engaged, themselves.

In some example embodiments, an individual user's preferences may be inferred based on a preference of the group participating in the conversation. For example, if the group requests boutique hotels in Miami, the inference module 304 infers that all users in the group prefer boutique hotels.

In some example embodiments, if the inference module 304 is unsure regarding a preference of the user, the inference module 304 triggers the response engine 216 to ask the user to verify the preference. For example, if the user indicates that they want to take a red-eye (e.g., overnight flight) from San Jose, Calif. to New York, the networked system 102 may ask the user if they generally prefer red-eye flights when flying cross country. The response of the user is then noted, by the preference module 222, to the profile of the user maintained by the networked system 102.

The sentiment analysis module 306 is configured to determine a sentiment of the user and thus identify a phase in a lifecycle (e.g., travel lifecycle) that the user is currently at. In some embodiments, the sentiment analysis module 306 infers where (e.g., what phase) the user is within the lifecycle based on the language and key terms in the communication. For example in a first travel phase (also referred to as an "exploratory phrase"), the user is looking for help with ideas. Some examples of language used include: "looking for ideas," "romantic beach vacation;" or "Euro trip." One way that the sentiment analysis module 306 infers the "exploratory-ness" of words (or any other characteristic of words) is using an algorithmic technique known as "word embeddings," which allows the sentiment analysis module 306 to understand a "distance" between words in a multi-dimensional "meaning" vector-space. For example, "budget" and "cheapest" are both very similar, whereas "cow" and "cheapest" are not.

As an example, take the words "Valentine's Day" in a user's communication. The sentiment analysis module 306 finds the closest "words" associated with "Valentine's Day" in the networked system 102's database of place descriptions (e.g. adjectives that users have used to describe destinations or hotels in the past). This database may include for example, "romantic," "loud," "family-friendly," and so forth. In this example, the sentiment analysis module 306 determines that "Valentine's Day" is most closely related to "romantic." The sentiment analysis module 306 next compares the words that match with destinations, themselves. For example, the networked system 102 comprises a database that shows "Paris" and "Fiji" ranks highly on a romantic scale, while "Cleveland" does not. With this information, the inference module 304 triggers the constructor module 210 to search for fares to both Paris and Fiji, and the result preparation module 214 can prioritize the results for the locations that are closest to the user's home).

In some example embodiments, the networked system 102 builds this database of place descriptions by making unique associations between words and destinations. For example, the networked system 102 knows that a certain week of the year is Spring Break at New England colleges, and the networked system 102 sees a spike in travel searches from cities like Ithaca and State College to Florida beaches. Therefore, the networked system 102 makes an entry in the database between "college" and particular destinations in Florida.

A second travel phase (also referred to as the consideration phase) involves the user still trying to decide on their travel plans. In this phrase, the key terms may include, for example "thinking about" and "trying to decide between." As it relates to understanding how far down a "travel purchase process" the user is, the sentiment analysis module 306 can also take as signals how specific the user's question is. For example, if the user says "I'm looking for flights to New York next week [or in the Spring]," the sentiment analysis module 306 infers that the user is more flexible and perhaps more cost-sensitive. If instead, the user says, "I'm looking for flights to New York next Monday that get in before 5 PM," the sentiment analysis module 306 infers the user is more schedule-constrained, and therefore more likely to be in a need-to-book mindset. In this example, the reply will, therefore, be more to-the-point and less solicitous of further inputs.

In a third travel phase (also referred to as a purchase phase), a decision has been made by the user to purchase travel components. In this phase, the key terms may include, for example "find me," "need," and "get me."

The sentiment analysis module 306 also looks at the types of questions that are asked in the message to determine a travel phase of the user. In the exploratory phase, the questions can include, for example, "What's a great beach getaway on a budget?" or "Can you send me some ideas for places to visit in Europe?" Iii the consideration phase, the questions contain more details (e.g., an indication of a location). For example, the questions can be "What's the cheapest day to fly from DFW to Tokyo in December?" or "Can you help me find a cheap hotel in downtown Portland?" Finally, in the purchase phase, the question will be very specific. Example questions in this phase include "I'm flying from Dallas to Tokyo on December 18, can you send me good flights?" and "I want to book the Sheraton in Portland on January 10."

The sentiment analysis module 306 also examines conversation among users in a group to determine the travel phase. For example, in the exploratory phase, the conversation can include comments such as, "We're planning a bachelor party!" or "Let's do a ladies weekend," while in the consideration phase, the comments are "We're looking for great hotels for a bachelor party in Vegas," or "We're trying to decide if our group should stay in a house or a hotel in Sonoma?" Finally, in the purchase phase, the comments in the conversation include specifics, such as "We want to book a vacation rental for our group in Sonoma on December 12," or "We've decided we want a hotel for the bachelor party on the Strip in Vegas" (this assumes the networked system 102 has previous knowledge, for example, from a prior message, for the dates of the bachelor party).

Figure 4:
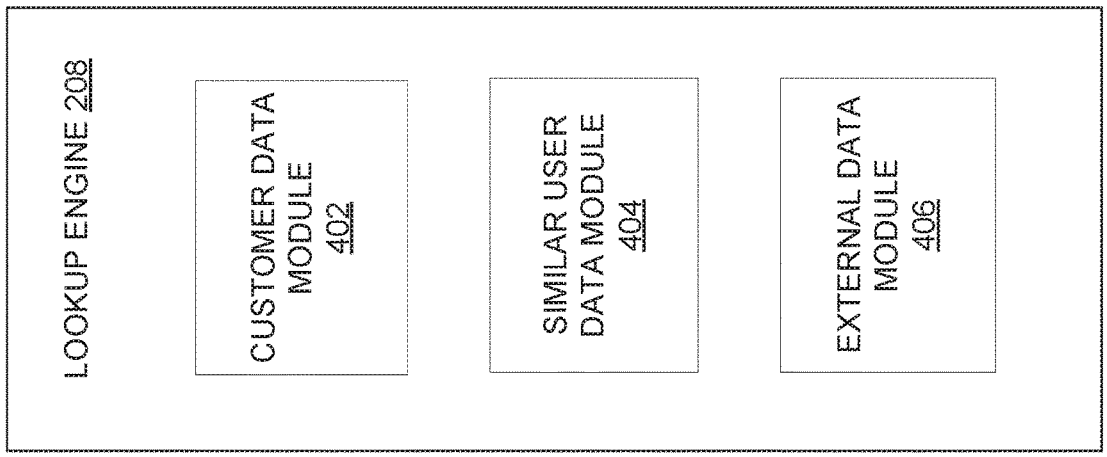
FIG. 4 is a block diagram illustrating components of a lookup engine, according to some example embodiments.

FIG. 4 is a block diagram illustrating components of the lookup engine 208, according to some example embodiments. The lookup engine 208 is configured to access various information that is used to construct the search criteria and weigh the search results. To enable these operations, the lookup engine 208 comprises a customer data module 402, a similar user data module 404, and an external data module 406.

The customer data module 402 assesses existing user data. In some example embodiments, the existing user data is retrieved (e.g., from an account or profile linked to the user) from the data storage 220. The existing user data provides preferences either explicitly provided by the user or inferred from past searches and purchases or from the communication. For example, the user may prefer to only fly certain airlines or stay at particular brands of hotels. The user may also have provide frequent membership information for various travel partners (e.g., frequently flyer user identifier). The user data can also integrate service preferences (e.g., Foursquare, Yelp, OpenTable) and historical behavior (e.g., particular restaurants, museums, or locations visited). These preferences can be used by the constructor module 210 to construct the search query, or used by the results preparation module 214 to generate the set of results.

The similar user data module 404 assesses user data of other users that share similar characteristic with the user. For example, the other users may share similar demographics with the user (e.g., age, income, origin of travel). The user data provides preferences or feedback (e.g., reviews) of the other users that share the similar characteristics with the user. These preferences can be used by the constructor module 210 to construct the search query, or used by the results preparation module 214 to generate the set of results (e.g., weight, sort, or filter the set of options).

The external data module 406 accesses external (e.g., third-party systems 108) for information that can affect the search query or be used to weigh and filter the search results in generating the set of results by the result preparation module 214. In an example using on-time percentage a flight is $25 cheaper, but is only on-time 50% of the time. In this example, the result preparation module 214 may advise against this option over a flight with better on-time percentage. In another example, a user is considering two flight options from SFO to Hartford in February. One flight stops in Dallas and the other in Chicago. A weather source can be accessed, by the external data module 406, to determine weather forecasts/predictions for Dallas and Chicago in February. This weather information is used to recommend (by the result preparation module 214) the option via Dallas to avoid snow delays in Chicago. The result preparation module 214 may also provide historical weather information to the user (e.g., Chicago faced 79 snow delays last year).

Figure 5:
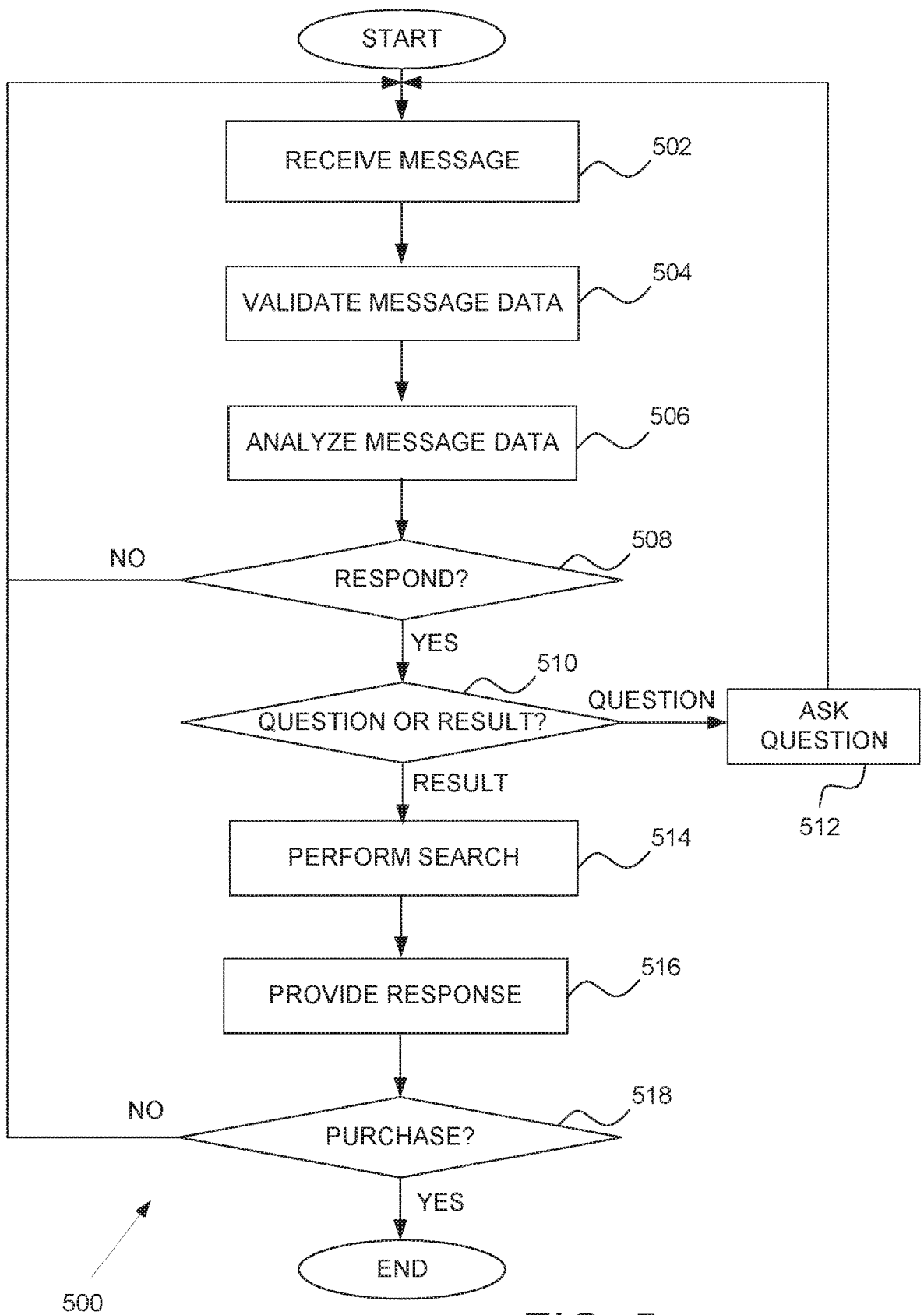
FIG. 5 is a flowchart illustrating operations of the networked system in performing a method of automatic conversation analysis and participation, according to some example embodiments.

FIG. 5 is a flowchart illustrating operations of the networked system 102 in performing a method 500 of automatic conversation analysis and participation, according to some example embodiments. Operations in the method 500 may be performed by the networked system 102, using modules described above with respect to FIG. 2. Accordingly, the method 500 is described by way of example with reference to the networked system 102. However, it shall be appreciated that at least some of the operations of the method 500 may be deployed on various other hardware configurations and the method 500 is not intended to be limited to the networked system 102. While FIG. 5 discusses embodiments related to travel, it is noted that example embodiments may be used to analyze and participate in conversations involving any type of topic.

In operation 502, the message receiver module 202 receives a communication in which the networked travel system 102 is a participant. For example the networked system 102 may be cc'd on an e-mail or included as a recipient of a message SMS, MMS, chat) among a group of users.

The communication is validated, in operation 504, by the data validation module 204 to insure that the communication does not contain misspelled terms. In some embodiments, any misspelled terms are corrected by the data validation module 204. Operation 504 also includes identifying date formatting used in the communication.

In operation 506, the communication is analyzed by the analysis engine 206. Analysis includes parsing the communication to identify key terms in the communication, inferring key terms from the communication, inferring preferences, and determining a sentiment and travel phase of the user. Operation 506 will be discussed in more detail in connection with FIG. 6 below.

In operation 508, a determination is made as to whether to provide a response. Depending on the sentiment and travel phase of the user, the response module 216 makes a determination whether to respond to that communication. Additionally, or in lieu of the sentiment and travel phase of the user, the determination as to whether a response should be provide can also depend on whether the networked system 102 was explicitly asked a question or referenced in the communication. If a determination is made not to respond, the method 500 returns to operation 502 when another communication in the conversation is received.

However, if a determination is made to respond, a determination is made in operation 510 as to whether the response should include a question or a comment/result (e.g., a location, a set of hotels). For example, if the networked travel system 102 needs clarification or is uncertain of the travel phase, the networked system 102 will ask a question in operation 512 to clarify the situation. Alternatively, if a determination is made to provide a comment/result, a search process is performed in operation 514 to obtain an appropriate comment or search results. The search process may comprise one or more API calls by the search engine 212 to the third-party systems 108 that trigger each of the third-party systems 108 to perform a search for options. The options are then returned to the networked system 102. Operation 514 will be discussed in more detail in connection with FIG. 7 below.

In operation 516, a response is provided. Operation 516 includes generating a set of results that are sorted, weighted, and filtered (e.g., by the result preparation module 214) based on preferences (e.g., preferences of the user, preferences of similar users) or externally sourced data (e.g., weather). The preferences may be accessed by the lookup engine 208. A response is then generated and formatted using the set of results (e.g., set of options) and transmitted, over the network 104, by the response engine 216.

Based on the analysis by the analysis engine 206, the response engine 216 provides an appropriate reply. For example, in the exploratory phase whereby the user is discussing general travel ideas, the response may include inspiration ideas (e.g., user mentions "beach" and the response includes top five beach destinations). The response engine 216 can also respond to user feedback with ideas that better meet a group's travel needs based on a variety of parameters (e.g., budget, location, time of day, date range, trip type (e.g., romantic, adventure, business)). Further still, assisted brainstorming can be provided whereby the search engine 212 is able to search the entire Internet to draw on ideas in contrast to a user only being able to draw on past experiences. For example, the user asks for ideas for beach getaways within driving distance from NYC. The user may think of the "Hamptons" immediately. However, the search engine 212 can identify obscure beach retreats in Connecticut, Rhode Island, and New Jersey, in addition to Long Island.

Once this type of brainstorming is initiated, the networked system 102 may proactively reach out to the user with new ideas, even when not requested. For example, the user initiated brainstorming for an island vacation. Several days later air fares to Bermuda go on sale. As a result, the response engine 216 proactively notifies the user of the sale. Accordingly, the networked system 102 maintains a "state" of both the user's purchasing and searching history as well as their conversation history. The purchasing history provides the user's home airport, for example, while the searching history indicates where they want to go.

In the consideration phase, the user is actively considering a few different options. The analysis engine 206 detects that the user has moved beyond ideation and is now trying to identify the best option to book. As a result, the search changes from free-form brainstorming to hone in on ideas. Further still, the response engine 216 may provide answers to questions regarding options. For example, the user may inquire as to when is the best time to fly in December. The networked travel system 102 searches based on a learned knowledge of price trends (e.g., accessed by the lookup engine 208) to find best dates. In another example, the user may ask when they should buy flight tickets. The lookup engine 208 looks at historical prices and the result preparation module 214 looks at future prices to issue buy advice (e.g., "be sure to buy these tickets before XY Day when we predict the price will increase").

In the consideration phase, the networked system 102 is also able to provide advice on pros and cons of different options. In one embodiment, the result preparation module 214 examiners a conversation history of the user (or prior conversations with the same user) to determine what is important to the user. For example, if the user talks about wanting to be near the beach, the response should proactively include distance from each hotel to the beach for this user.

In embodiments involving a group of users, the itinerary (e.g., proposed itinerary) provided to each user should match up with the other group members. For example, if the group is flying from different cities to Maui, the result preparation module 214 can provide itineraries such that group members meet up in a connection city and connect to a same flight. For instance, if the users are coming from various Midwestern cities to Maui, the result preparation module 214 may suggest flights that connect onto the same flight (e.g. via LAX). In this situation, the cheapest options are weighted less if there are options a little more expensive that are much better for the group staying together.

In the purchase phase, the user(s) are ready to book travel. The analysis engine 206 detects that a decision has been finalized, and the result preparation module 214 provides concrete plans to the user. Additionally, the result preparation module 214 provides purchase guidance (e.g., buy or wait guidance; or feedback on quality of the deal (e.g., "Is this a good price for this hotel?")).

In some situations, the user's preferences may have been so explicitly stated previously or so consistent among previous bookings, that the networked system 102 can skip/largely skip the "consideration" phase. For example, if the user has indicated, "I only stay at Hiltons," or has a history of booking only Hiltons, the networked system 102 can go straight from destination exploration to suggesting particular Hiltons, skipping the phase where the networked system 102 would normally ask the user, "what kind of hotel are you looking for?"

As such, the user may include the networked system 102 in a conversation at any one of the lifecycle phases (e.g., exploratory, consideration, purchase). The networked system 102 helps the user within that phase. For each phase, the networked system 102 helps the user consider a variety of options and helps facilitate the conversation by keeping the conversation focused on the original goal and tabling out-of-scope discussion (e.g., user trying to find hotel in Phoenix and then brings up a trip to Europe, the networked system 102 replies politely to work on the Europe trip after finding the best options in Phoenix).

The networked system 102 also attempts to bring each phase to a close by narrowing in on the best option(s) for the user in order to proceed to the next phase in the lifecycle. Accordingly, the networked system 102 tracks the conversation flow of the user. Example of lifecycle facilitation include:

i. Exploratory phase:
1. Open:
   a. User: "I'm interested in a vacation in the South Pacific"
   b. Response: "Let's explore the islands!"
2. Facilitate:
   a. User: "We can go to Tahiti"
   b. Response: "That's a great option, also consider Bora Bora and Fiji"
3. Close
   a. The networked system 102 takes the lead and narrows the focus to just island.
ii. Consideration phase:
1. Open:
   a. User: "1 like the idea of Fiji"
   b. Response: "Great! We've got a number of good hotels, what are you looking for in a hotel?"
2. Facilitate:
   a. User and networked system 102 discuss what to consider in hotels,
3. Close:
   a. The networked system 102 takes the lead and proposes a single hotel or set of hotels
iii. Purchase phase:
1. Open:
   a. User: "The Westin Fiji looks great."
   b. Response: "Great! For $399 per night we can book a resort queen room or a resort king room."
2. Close: User can click to book or can book by telling the networked system 102 (if they have a profile and credit card saved).

Further still, the result preparation module 214 can recognizing distance and adjust the response accordingly. In some example embodiments, the networked system 102 knows that users view flights differently depending on the type of flight. For example, a commuter flight would be from New York to Boston, while a cross country flight would be from Nashville to Los Angeles and an international flight is from San Francisco to Tokyo. A long haul flight could be from New York to Singapore. These distinctions may be assessed based on the distance of the flight and whether the flight is domestic or international.

Typically a long flight is considered a high-commitment route and a short flight is considered a low-commitment route. In some embodiments, the networked system 102 can also, on a user-specific basis, know that certain otherwise high-commitment routes are actually low-commitment. For example, normally a London to New York flight is viewed as a high-commitment flight (e.g., long and also international). However, if a user travels that route weekly, the result preparation module 214 infers that it's not a high-commitment flight for that particular user. The degree of commitment may change the language the response engine 216 uses (e.g., based on the user being earlier in their decision-making process when it's a high-commitment flight; based on the user being later in their decision-making process when it's a low-commitment flight).

Furthermore, if the networked system 102 detects that the same flight is booked often by the user, the result preparation module 214 may suggest that the user sign up for a reminder to book the same flight next time (e.g. week or month). This potentially give the user a chance to set up "auto-book" (e.g., with their credit card saved) so that the networked system 102 can re-book that flight for them every period.

As such, the networked system 102 delivers a different experience for each scenario (e.g., phase in the lifecycle, commitment level) and communicates differently to the user (e.g., based on preferences). For example, with respect to a commuter flight, the conversation may be more casual since the user may be less concerned with details. However, for a long haul flight, the user will be more concerned with details (e.g., seating class options, layover, price, travel time).

The networked system 102 also recognizes unique locations versus frequent locations. For frequent locations or itineraries, the networked system 102 understand when a user is "returning home" or "visiting family." In these scenarios, the user has a reduced need for a hotel and rental car. There is also an increased need to save the itinerary for future use. Further still, there is an increased need to notify family/friends of travel status (e.g., flight on-time status, weather delays). Additionally, the networked system 102 uses inferred understanding of the "purpose" or "requirements" of the trip (e.g. multiple people with the same last name=family, or multiple people traveling from State College to Florida=spring break) to provide reviews/snippets or general customer sentiment about, for example, particular hotels or flights.

For these frequent itineraries, the user may also want the networked system 102 to monitor these itineraries. The networked system 102 may proactively notify the customer when price has dropped below an average (or threshold), a new flight route is available, a new airline is flying the route, or an airline is having a sale.

The networked system 102 (e.g., the analysis engine 206) understands different conversation types, styles, and key terms. For example, use of an emoji may indicate a younger user group. In another example, the networked system 102 infers that when a user uses key travel words that may indicate that the user is looking for unique experiences. For instance "backpacking" can indicate that the user may want hostels, while "honeymoon" can indicate that the user may want upscale results. The methodology is similar to the "word embedding" approach described above.

The networked travel system 102 also has the ability to pick up on trending keywords or terms. Trending keywords may be events that are "hot" or popular for a certain period of time or season. Example keywords include ski weekend, beach weekend, SXSW, and Macy's Thanksgiving Day Parade. Here, the networked system 102 makes suggestions based on what other users have done (e.g., if 20 searches in the last week for ski destinations in San Francisco suggested the same three hotels to all 20 of them, but 15/20 booked hotel #2, the networked system 102 tells the 21st person that asks for ski trips near San Francisco that "other people love [hotel #2]."). For example, if the user asks for a "quiet ski weekend," but lots of people have searched for a ski weekend on a specific weekend, the networked system 102 replies "avoid weekend X, because lots of people will be skiing then. If that's the only weekend you're free, consider these other outdoors (non-ski) destinations, or these other ski destinations further away that are less searched-for."

In addition, the networked system 102 can use a calendar functionality to give users customize the response. That is, in some embodiments, the networked system 102 has access to the user's calendar. But knowing calendared events, the networked system 102 can, for example, provide nagging reminders (e.g., "perhaps you shouldn't go on this trip with your friends, because we see you have a meeting with a colleague in a different city on the same dates."). Additionally, by tying into the user's calendar, the networked system 102 can make personal recommendations based on the user's schedule, see prior booking preferences (e.g. for airlines and hotels), book hotel near scheduled meetings/events, and recognize a user's milestones (e.g., birthdays, anniversaries).

In operation 518, a determination is made as to whether a travel component (or option) or itinerary is to be purchased. In some example embodiments, the booking module 218 receives an indication from the user to purchase the travel component. The booking module 218 processes one or more reservations or payments (e.g., notifies a travel partner at the corresponding third-party system 108 to reserve the travel component and transmits payment if needed). Data associated with the booking (e.g., confirmation number, receipt, booked travel itinerary) are stored to an account or data structure linked to the user(s) in the data storage 220.

Figure 6:
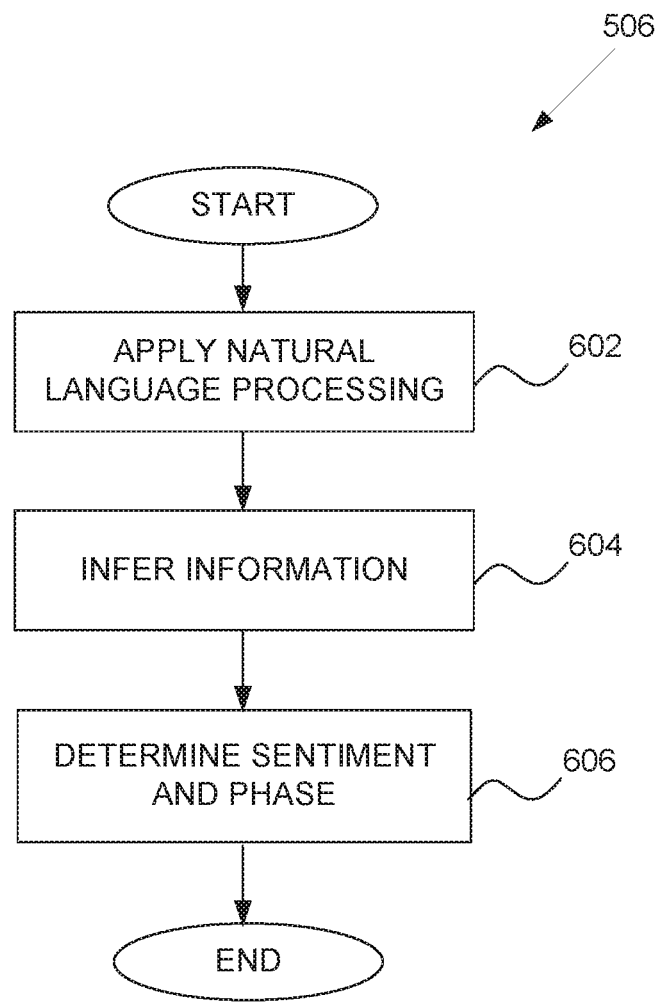
FIG. 6 is a flowchart illustrating operations of the networked system in analyzing message data, according to some example embodiments.

FIG. 6 is a flowchart illustrating operations of the networked system 102 in analyzing communication or message data (operation 506), according to some example embodiments. Operations in the method (operation 506) may be performed by the analysis engine 206. Accordingly, the method 506 is described by way of example with reference to the analysis engine 206. However, it shall be appreciated that at least some of the operations of the method 506 may be deployed on various other hardware configurations and the method 506 is not intended to be limited to the analysis engine 206.

In operation 602, natural language processing is applied to the received message. The natural language processing module 302 is configured to use natural language processing algorithms to understand what the user has asked or communicated in a message. In some example embodiments, the natural language processing module 302 parses the message in order to identify key terms. These key terms can be used by the lookup engine 208 and the constructor module 210 to generate the search query.

In operation 604, information is inferred from the message. In situations where the user is not explicit in their message regarding travel plans, the inference module 304 attempts to identify the key terms. The information can be inferred from key terms extracted by the natural language processing module 302 and from a header associated with the message. Further still, the inference module 304 infers preferences based on metadata from the message of a conversation (e.g., area codes, country codes, e-mail domains, number of recipients, last name of recipients, frequency of messages). In some embodiments, if the inference module 304 is unsure of a preference inferred from the conversation, the inference module 304 triggers the response engine 216 to send a message to the user requesting confirmation of the preference. It is noted that if the user is explicit in the message, operation 604 may be optional.

In operation 606, a sentiment of the user and a lifecycle phase is determined. The sentiment analysis module 306 is configured to determine the sentiment of the user. In some embodiments, the sentiment analysis module 306 infers from the parsed key terms and any inferred information (e.g., operations 602 and 604) a sentiment of the user. Based on the sentiment, the sentiment analysis module 303 can determine where in the lifecycle the user is.

Figure 7:
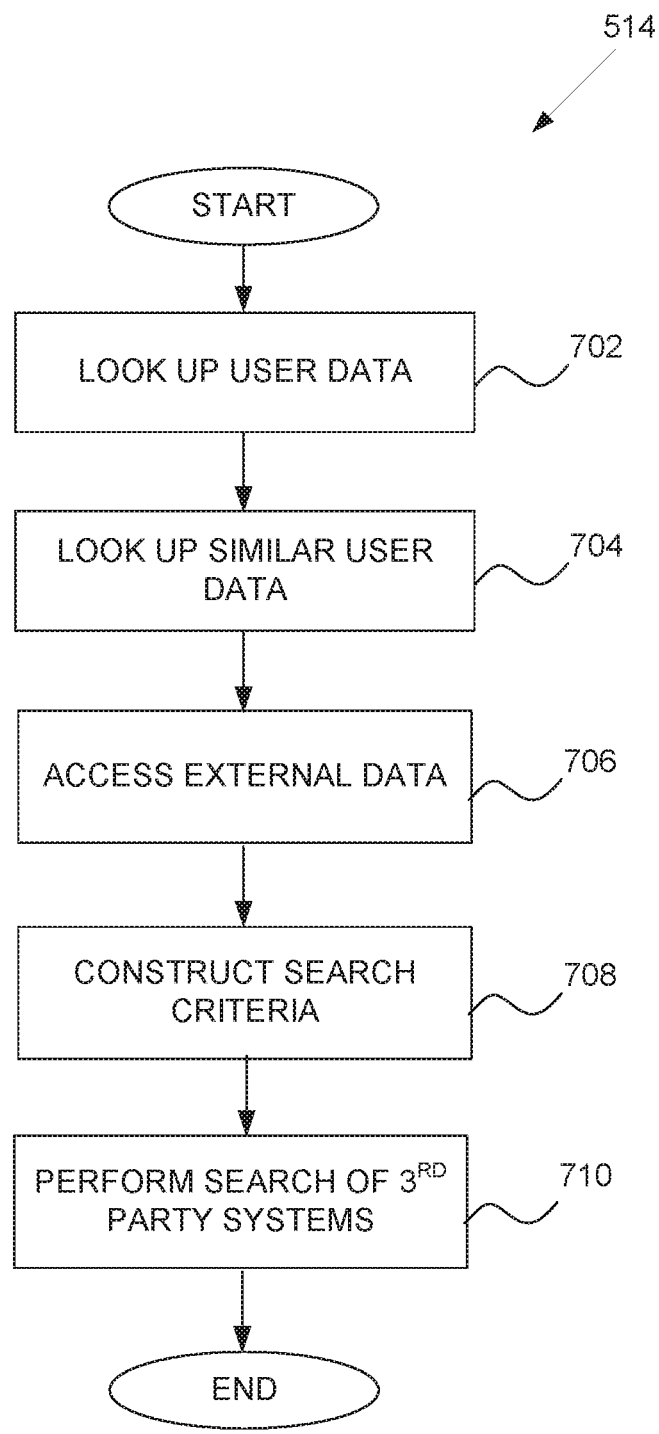
FIG. 7 is a flowchart illustrating operations of the networked system in performing a search, according to some example embodiments.

FIG. 7 is a flowchart illustrating operations of the networked system 102 in performing a search process (operation 514), according to some example embodiments. Operations in the method (operation 514) may be performed by the networked system 102, using modules described above with respect to FIG. 2. Accordingly, the method 514 is described by way of example with reference to various components of the networked system 102. However, it shall be appreciated that at least some of the operations of the method 514 may be deployed on various other hardware configurations and the method 514 is not intended to be limited to the various components of the networked system 102.

In operation 702, user data is looked up. In some example embodiments, the customer data module 402 assesses existing user data (e.g. from a user account/profile accessed from the data storage 220). The existing user data provides preferences either explicitly provided by the user or inferred from past searches, conversations, purchases, or any suitable combination thereof. In a travel embodiment, the preferences include, but are not limited to, time of day preferred for flight departure, preferred airport, preferred rental car type, preferred rental car brand, preferred airline, preferred airline seat/class, brand loyalty membership (e.g., Star Alliance, Hilton Hhonors), airline/hotel type (e.g., boutique, business), preferred hotel amenities (e.g., near elevator, high floor), frequent itineraries (which may be continually monitored for sales), and frequent travel locations (e.g., indication that the user is visiting family).

In operation 704, similar user data is looked up. In some example embodiments, the similar user data module 404 assess user data of other users that share similar characteristic with the user (e.g., stored in the data storage 220). For example, the other users may share similar demographics with the user (e.g., age, income, origin). The user data provides preferences of the other users that share the similar characteristics with the user.

In operations 706 external data is accessed. In some example embodiments, the external data module 406 accesses external systems (e.g., third-party systems 108) for information that can affect the search query or weighting and filtering of the search results in generating the set of results. External data may include, for example, on-time performance, weather, traffic conditions, reviews, or any other information obtainable form a third-party source that can affect the search query and ranking of search results.

In operation 708, a search query is constructed. The constructor module 210 is configured to construct the search query based in part on information obtained from the conversation. As such, the constructor module 210 creates the search query based on user's unstructured text from the conversation and the data obtained in operations 702-706. In particular, the constructor module 210 merges data retrieved by the lookup engine 208 along with key terms detected or inferred by the analysis engine 206. In some embodiments, the constructor module 210 also sorts, filters, and weighs one or more of the data retrieved by the lookup engine 208 or the key terms detected or inferred by the analysis engine 206 in generating the search query.

In operation 710, a search of one or more third party systems is triggered using the search query. Accordingly, the search engine 212 receives the search query constructed by the constructor module 210, and triggers one or more searches to identify information or matching options (e.g., travel components). In some example embodiments, the search engine 212 triggers the third-party systems 108, via API calls, to identify the information or matching options. For example, the search engine 212 makes an API call to a hotel system to identify available hotel rooms in a particular location over a particular time period and their corresponding rates. Other third-party systems 108 that are searched may including airline systems (e.g., to search for available flights), car systems (e.g., to find rental car availability and rates), and events systems (e.g., find tickets to an event).

Figure 8:
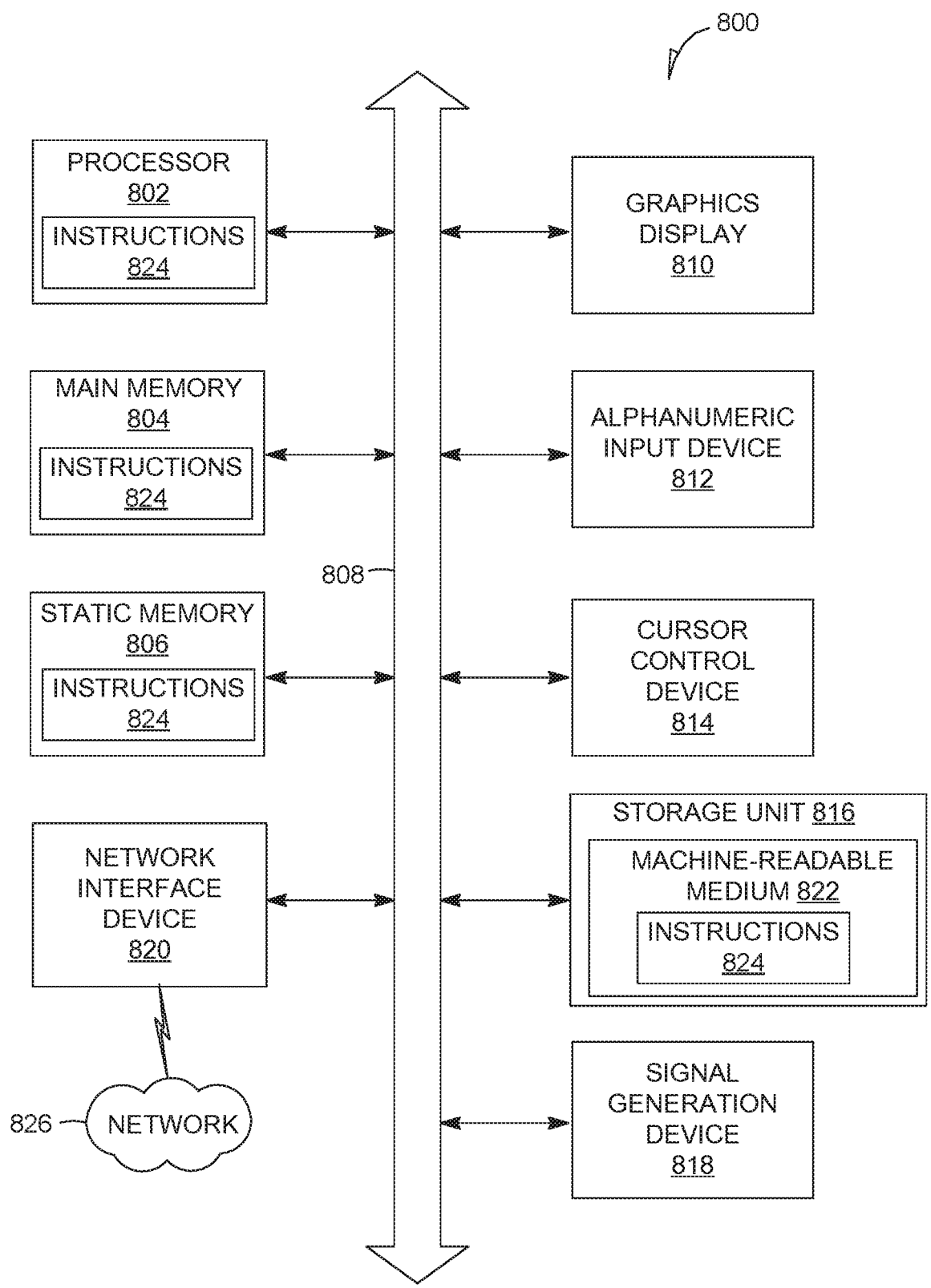
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example the instructions may cause the machine 800 to execute the flow diagrams of FIGS. 5-7. The instructions can transform the general, non-programmed machine into a particular machine (e.g., specially configured machine) programmed to carry out the described and illustrated functions in the manner described In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine capable of executing the instructions 824, sequentially or otherwise, that specify actions to be taken by that machine 800. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media 822 (e.g., tangible and non-transitory machine-readable media).

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include; but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions, when executed by one or more processors of the machine (e.g., processor 802), cause the machine to perform any one or more of the methodologies described herein. The term "machine-readable medium" shall accordingly be taken to include, but not be limited to, one or more data repositories in the form of a solid-state memory; an optical medium, a magnetic medium, or any suitable combination thereof. Therefore, the machine-readable medium may be referred to as a hardware storage device.

Furthermore, the machine-readable medium 822 is non-transitory in that it does not embody a propagating or transitory signal. However, labeling the machine-readable medium 822 as "non-transitory" should not be construed to mean that the medium is incapable of movement—the medium should be considered as being transportable from one physical location to another. Additionally; since the machine-readable medium 822 is tangible, the medium may be considered to be a machine-readable device. Furthermore, the machine-readable medium does not comprise any transitory signals.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to hose listed after such a term in a claim are still deemed to fall within the scope of that claim.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, by a networked system, a communication that is a part of a conversation involving one or more users, the networked system being a participant in the conversation;
   analyzing, by one or more hardware processors of the networked system, the communication, the analyzing including inferring a lodging type preference shared in common by the one or more users based on a quantity of recipients of the communication indicated by metadata in the communication;
   triggering, by the networked system, a search process based in part on the inferred lodging type preference shared in common by the one or more users;
   generating, by the networked system, a customized response comprising results of the search process; and
   transmitting, by the networked system over the network, the customized response to a device of a user among the one or more users.

2. The method of claim 1, further comprising storing the inferred lodging type preference to a profile of the user by updating a data structure associated with the networked system, the stored inferred lodging type preference being retrievable by the networked system for use in a future search process.

3. The method of claim 1, wherein:
   the communication comprises at least one of an e-mail communication, an SMS message, or a chat message; and
   the networked system is a designated recipient of the communication.

4. The method of claim 1; wherein the triggering of the search process comprises:
   constructing a search query that includes the inferred lodging type preference;
   causing a search to be performed, at a third-party system, using the search query by making an application program interface (API) call to the third-party system; and
   compiling search results to be returned in the customized response.

5. The method of claim 1, further comprising generating and transmitting a message to the device of the user, the message requesting that user confirm the inferred lodging type preference.

6. The method of claim 1, wherein the metadata comprises an area code of the user.

7. The method of claim 1, wherein the metadata comprises a country code of the user.

8. The method of claim 7, wherein the generating of the customized response comprises generating the customized response in a language associated with the country code or providing costs in a local currency.

9. The method of claim 1, wherein the metadata comprises an email domain indicative of eligibility for a discount.

10. The method of claim 1, wherein the metadata comprises an email domain indicative of a hotel or flight preference.

11. The method of claim 1, wherein the metadata indicates a same last name among a plurality of the users and the the same last name indicates that the plurality prefers traveling together.

12. The method of claim 1, wherein the metadata indicates a frequency of communications in the conversation, the method further comprising:
- determining a level of engagement of the user based on the frequency of the communications; and
- pacing the generating and transmitting of customized responses based on the level of engagement.

13. A networked system comprising:
- one or more hardware processors; and
- a hardware storage device comprising instructions that, when executed by the one or more hardware processors, cause the networked system to perform operations comprising:
- receiving a communication that is a part of a conversation involving one or more users, the networked system being a participant in the conversation;
- analyzing the communication, the analyzing including inferring a lodging type preference shared in common by the one or more users based on a quantity of recipients of the communication indicated by metadata in the communication;
- triggering a search process based in part on the interred lodging type preference shared in common by the one or more users;
- generating a customized response comprising results of the search process; and
- transmitting, over the network, the customized response to a device of a user among the one or more users.

14. The networked system of claim 13, wherein:
- the communication comprises at least one of an e-mail communication, an SMS message, or a chat message; and
- the networked system is a designated recipient of the communication.

15. The networked system of claim 13, wherein triggering the search process comprises:
- constructing a search query that includes the inferred lodging type preference;
- causing a search to be performed, at a third-party system, using the search query by making an application program interface (API) call to the third-party system; and
- compiling search results to be returned in the customized response.

16. The networked system of claim 13, wherein the operations further comprise generating and transmitting a message to the device of the user, the message requesting that user confirm the inferred lodging type preference.

17. A hardware storage device comprising instructions that, when executed by one or more hardware processors of a machine, cause the machine to perform operations comprising:
- receiving a communication that is a part of a conversation involving one or more users, the networked system being a participant in the conversation;
- analyzing the communication, the analyzing including inferring a lodging type preference shared in common by the one or more users based on a quantity of recipients of the communication indicated by metadata in the communication;
- triggering a search process based in part on the interred lodging type preference shared in common by the one or more users;
- generating a customized response comprising results of the search process; and
- transmitting, over the network, the customized response to a device of a user among the one or more users.

18. The hardware storage device of claim 17, wherein the operations further comprise generating and transmitting a message to the device of the user, the message requesting that user confirm the inferred lodging type preference.

* * * * *